(No Model.)
C. L. ALEXANDER.
HORSE RAKE.
No. 602,535. Patented Apr. 19, 1898.
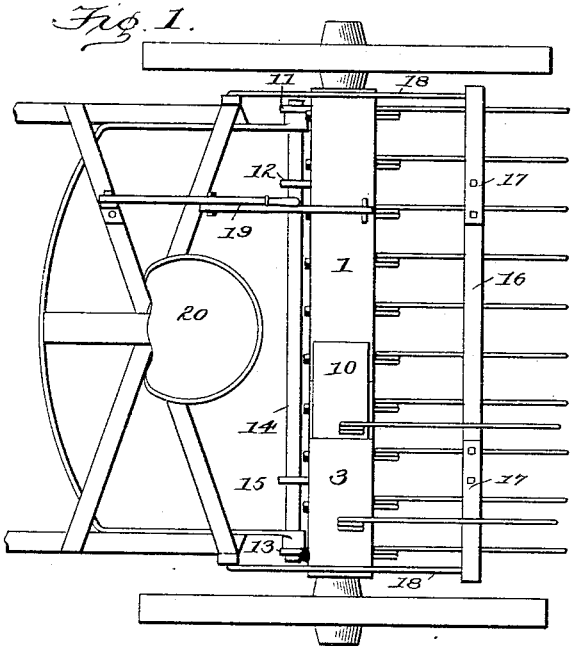
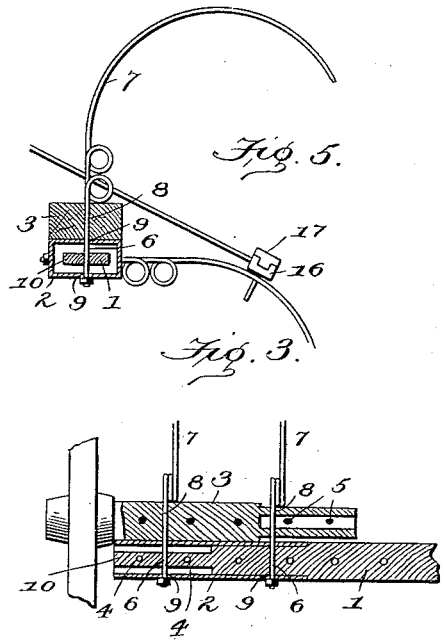
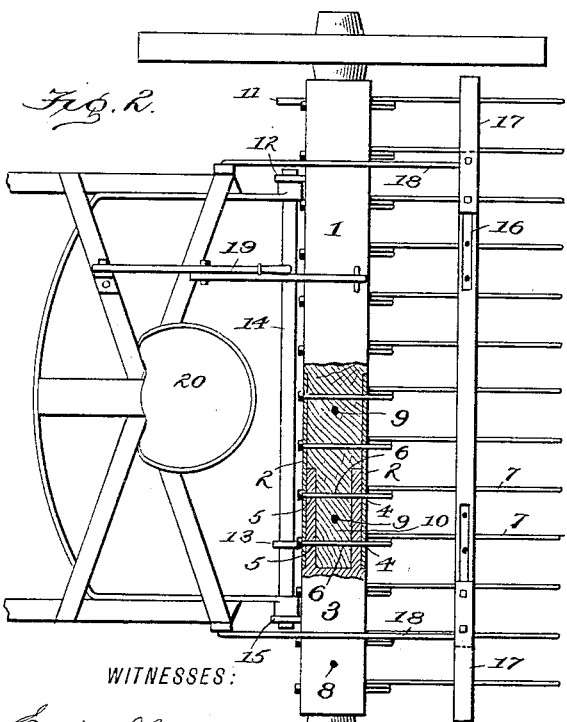
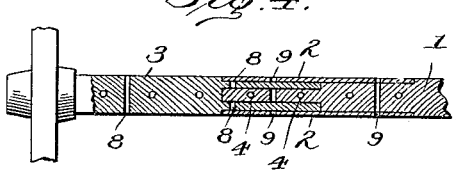
WITNESSES:
Edwin L. Bradford
Geo. M. Copenhaver
INVENTOR
Clarence L. Alexander
BY
Johnson and Johnson
ATTORNEY

UNITED STATES PATENT OFFICE.

CLARENCE L. ALEXANDER, OF COMO, TENNESSEE.

HORSE-RAKE.

SPECIFICATION forming part of Letters Patent No. 602,535, dated April 19, 1898.

Application filed August 26, 1897. Serial No. 649,590. (No model.)

*To all whom it may concern:*

Be it known that I, CLARENCE L. ALEXANDER, a citizen of the United States, residing at Como, in the county of Henry and State of Tennessee, have invented a new and useful Improvement in Horse-Rakes, of which the following is a specification.

I have improved the type of wheeled rake in which the axle is made the rake-head for the trailing teeth; and my improvement is directed to a novel construction whereby the axle may be shortened to adapt the wheel-rake for passing through gateways, narrow lanes, or wooded roadsides. For this purpose the improvement resides in constructing the axle of a long and a short part, providing each part with an end sleeve and mortised construction to receive the short part and employing the shanks of the trailing teeth as bolts passing through coincident holes in the sleeve and the short axle part, making the axle as one piece for working the rake its full width. For shortening the rake the two teeth used to secure the short axle part in the sleeve are removed, the short axle part withdrawn from the sleeve and placed in lapping position upon the sleeved end of the axle and secured by passing the shanks of the two removed teeth through coincident holes in the lapped parts, so that the securing-teeth stand upward. In the different positions of the short axle part the fastening-teeth are secured by the same nuts. By this construction a very simple and convenient way is provided for shortening the width of the rake as it may be required for transportation.

In the accompanying drawings I have shown in Figure 1 in top view the rake in full width, the rake-head being in partial section to show the fastening of the short axle part within the sleeve of the long axle part by the shanks of the trailing teeth. Fig. 2 is a like view of the rake made shorter, the short axle part being separated from and secured upon the sleeved end of the long axle part by using the teeth-shanks as fastening-bolts. Fig. 3 is a vertical section of the rake-head as shortened. Fig. 4 is a like section of the rake-head sections coupled, and Fig. 5 is a vertical cross-section of the shortened axle as seen in Fig. 3.

The axle forms the rake-head and is constructed of a long and a short section, to each of which the spring trailing teeth are secured. The shanks of the teeth may be of any suitable cross-section and, passing through holes in the axle, are secured by nuts. On the end of the long axle part 1 a sleeve 2 is secured, into which the short axle part 3 is secured when using the rake its full width, as in Fig. 1.

The sleeve 2 and the short axle part 3 are made with coincident holes 4 4 5 5, and the shanks 6 of the rake-teeth 7 7, passing through these holes, firmly bind and secure the axle parts together. For this purpose the shanks 6 6 of two of the teeth 7 pass through the sleeve and through the coupled end of the short axle part, as in Fig. 1, making the rake its full width.

To shorten the rake, the two rake-teeth 7 7 are removed and the short axle part separated from the sleeve and placed upon the top of the axle, lapping with the sleeve. The two rake-teeth 7, which had been removed, are then used to secure the lapped axle parts by passing the shanks 6 6 of said teeth vertically through coincident holes in the lapping parts and nutting the shanks on the under side of the axle, as in Figs. 3 and 5. For this purpose the short axle part has holes 8 8, corresponding with the holes 9 9 in the sleeve to receive the teeth-shanks in the full width of the rake. This way of employing the nutted rake-teeth as the means of fastening the short axle part makes it very convenient and easy for changing the rake. Provision is made for changing the line of draft for the shortened rake by providing the long axle part with three eyes 11, 12, and 13, into which the draft-rods 14 of the shafts are secured, as in Fig. 2. The short axle part has an eye 15, into which the draft-rod is adjusted when using the rake full width.

The spring-teeth are raised by the turning of the axle to permit the load to drop off, thus dumping the rake, the teeth being cleared from the load in the usual manner by a toothed clearing device consisting of a bar 16, supported crosswise upon the spring-teeth, so that in raising the trailing teeth the toothed bar will ride upon them with the teeth of the cross-bar standing down between the rake-teeth, as in Fig. 5. This toothed clearing-bar I provide with an adjustable end piece 17, by which the bar may be shortened to conform to the shortened rake, as in Fig. 6. The adjustable end piece fits by tongue and groove upon the bar and is secured to it by screws, the adjustment being made at both ends of the rake, so that the toothed clearing device is adjusted in length to suit the full width of the shortened rake.

The toothed clearing-bar is hung to the shaft-frame by rods 18, and the rake is dumped by means of the lever 19, connecting the shafts and the axle.

The driver's seat 20 is mounted upon the shafts.

It is obvious that the sleeve may be secured to the short axle part. In addition to the sleeve the long axle part 1 may have a tenon 10 to enter a socket in the end of the short axle part, making a sleeve of this axle part secured to a tenon of the long axle part and thereby strengthen and brace the connection.

I claim as my improvement—

1. In a wheeled rake adapted to be shortened, the long and short axle parts, one part having an end sleeve adapted to receive the end of the other axle part, the one part secured within the sleeve by the nutted shanks of the spring-teeth passing through coincident holes in the sleeve and in the other axle part whereby to give full width to the rake.

2. In a wheeled rake adapted to be shortened, the long and short axle parts, the longest part having an end sleeve whereby the axle parts are coupled and secured together by the rake-teeth shanks, the provision whereby the rake is shortened which consists in securing the short axle part upon the sleeved part by the nutted shanks of the spring-teeth vertically passed through coincident holes in the lapped parts, and means for shifting the draft-rod of the shafts upon the longest axle part.

3. In a wheeled rake, the long and short axle parts, the longest part having an end sleeve whereby the two parts are coupled and secured together, by the nutted shanks of the spring-teeth, the means for shortening the rake which consists in securing the short part in the axle lapping upon the upper side of the sleeved part by the nutted shanks of the spring-teeth carried by said short axle part, and means for shifting the draft-rod of the shafts on the axle and means for shortening the clearing-bar of the teeth to conform to the shortened rake.

4. In a wheeled rake adapted to be adjusted in width, the long and short axle parts, having each a sleeve at its end adapted to receive and engage a corresponding end tenon of the coupled parts, in combination with the trailing spring-teeth the nutted shanks of which pass through and secure the coupled axle-sleeve parts.

In testimony whereof I have hereunto signed this specification, in the presence of witnesses, this 3d day of August, 1897.

CLARENCE L. ALEXANDER.

Witnesses:
GEO. W. MOORE,
F. M. LAVINS.